United States Patent Office 3,647,777
Patented Mar. 7, 1972

---

3,647,777
MIXED NITROSO HYDROCARBONS
Russell L. Hudson, Kenneth C. Williams, and Martin B. Smith, Baton Rouge, La., assignors to Ethyl Corporation, New York, N.Y.
No Drawing. Filed Nov. 12, 1969, Ser. No. 876,076
Int. Cl. C07c 81/00, 105/00
U.S. Cl. 260—143          5 Claims

ABSTRACT OF THE DISCLOSURE

A method of making or preparing mixed nitrosoalkane or nitroso aromatic dimers for use as antiknock compounds.

BACKGROUND OF THE INVENTION

Field of the invention

The present invention is in the field of the synthesis or preparation of nitrosoalkanes and nitroso aromatic compounds. Such compounds have utility as antiknock agents or as additives for hydrocarbon fuel.

Description of the prior art

Nitroso hydrocarbons have previously been prepared by photolysis as described in detail in the Journal of the Chemical Society of 1956, p. 1670, and is illustrated by the following equation:

$$R_2-\overset{R_1}{\underset{R_3}{C}}-ONO \rightarrow \overset{R_2}{\underset{R_3}{>}}C=O + R_1NO$$

wherein, $R_2$ and $R_3$ are either hydrogen or an alkyl group and $R_1$ is the alkyl group desired in the nitroso hydrocarbon to be prepared.

SUMMARY OF THE INVENTION

The present invention relates broadly to the preparation of stable mixed nitroso dimers for use as antiknock compounds. These dimers may be represented by the formula:

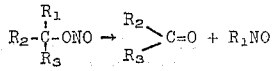

wherein R and R′ are two different alkyl or aryl groups. One group may be alkyl and the other may be an aryl group.

DESCRIPTION OF THE PREFERRED EMBODIMENTS

The mixed nitrosoalkane or nitroso aromatic dimers may be prepared from the formation of RNO in a solution of R′NO as follows:

$$2\ N_2O_4 + R_4Pb + 2\ R'NO \xrightarrow{\text{in a solvent}} 2\ \overset{O\ O}{\underset{\uparrow\ \uparrow}{R-N=N-R'}} + R_2Pb\ (NO_3)_2$$

wherein R and R′ are different alkyl or aryl groups.

The reaction is normally carried out at room or ambient temperature and at atmospheric pressure. A preferred temperature range is from 5° C. to 50° C. One mole of the alkyl lead compound is mixed with two moles of the alkyl nitrite in the presence of a solvent in a suitable container. Subsequently, the dinitrogen tetroxide is bubbled into the solution until no longer absorbed. About twelve parts of solvent are used to one part of the organic lead compound. Very good yields of the mixed nitroso dimer, about 90%, can be obtained with this reaction.

For optimum results a solvent is desired in the reaction and a polar solvent is particularly useful. The solvent should be one in which the reactants, the mixed nitroso dimer reaction product and trialkyl lead nitrate, are soluble therein. The dialkyl lead nitrate is precipated out.

Preferred solvents which may be employed are ethers, ketones and alkyl halides. Suitable ethers include the alkyl ethers such as diethyl ether, methyl/ethyl ether, diisopropyl ether, dibutyl ether, di-n-butyl ether, dihexyl ether, and the like; and aryl ethers such as diphenyl ether, phenyl ethyl ether, ditolyl ether and the like. Other suitable ethers include the cyclic ethers such as tetrahydrofuran, 1,4-dioxane, 3-ethyl tetrahydrofuran, 2-(o-toloxy) tetrahydrofuran, tetrahydropyran, N-methyl morpholine, the methyl ether of tetrahydrofurfuryl alcohol, e-phenoxy-tetrahydrofuran, 4-ethoxytetrahydrofuran, 2,5-dihydrofuran, 4-methoxytetrahydropyran, 2-ethoxy-3,4-dihydro-2,4-pyran, mixtures thereof and the like. Additionally, glycol ethers such as dimethoxy ethane, the dimethyl ether of diethylene glycol, the diethyl ether of diethylene glycol, the dibutyl ether of diethylene glycol, mixtures thereof and the like, may be employed as solvents.

Suitable ketones include acetone, butanone, 2-pentanone, and 3-methyl-2-butanone and the like. Suitable alkyl halides include methyl chloride, ethyl bromide, propyl iodide, isopropyl iodide, butyl chloride, sec-butyl bromide, tert-butyl iodide, amyl chloride, sec-amyl chloride, isoamyl chloride, sec-isoamyl iodide, tert-amyl bromide and neopentyl chloride and the like.

Additionally, liquid hydrocarbon solvents, either aliphatic or aromatic may be used, but yields are not as great. Some examples of these solvents are pentane, heptane, n-hexane, kerosine, gasoline and toluene.

In general, any member of the aforementioned classes of compounds which is a liquid at the temperature of reaction may be employed. Those solvents which are liquids at ambient temperatures and pressures are more conveniently handled and are therefore preferred.

In another preferred form of the invention, mixed nitrites may be heated to prepare the desired mixed nitroso dimer as follows:

$$RONO + R'ONO \xrightarrow{\Delta} \overset{O\ O}{\underset{\uparrow\ \uparrow}{R-N=N-R'}}$$

wherein R and R′ are different alkyl or aryl groups.

In this form of the invention the alkyl nitrites are mixed together in a suitable container in a one to one mole ratio and heated to a temperature sufficient to carry out the reaction. The reaction is at atmospheric pressure. A preferred temperature is 320° C. with a range of 250° C. to 350° C. being suitable. Higher temperatures may be used if desired. Gaseous by-products are vented off. Yields of the mixed nitroso dimers of up to about 50% may be obtained in this manner.

In one specific method of reacting the alkyl nitrites, equal moles of each nitrite are metered into a mixing chamber, transferred to a reaction zone or furnace and heated to the desired temperature. The reaction product is transferred to a condenser such as a Dry Ice and acetone tray and cooled. Yields are moderate.

In another preferred form of the invention, the mixed nitroso dimers may be prepared by a redistribution of two homodimers in a suitable solvent as follows:

$$(RNO)_2 + (R'NO)_2 \xrightarrow{\text{in a solvent}} 2\ \overset{O\ O}{\underset{\uparrow\ \uparrow}{R-N=N-R'}}$$

wherein R and R′ are different alkyl or aryl groups.

The foregoing reaction is carried out at atmospheric pressure and room temperature, with a temperature range of from 20° C. to 50° C. being preferred. The reaction must also be performed in the presence of a polar solvent. The reactants must be soluble in the solvent and a sufficient amount of the solvent is employed to dissolve the reactants. An excess of solvent may be used if desired. Suitable solvents are those described previously herein.

The following examples are illustrative of methods of preparing specific mixed nitroso dimers:

EXAMPLE I

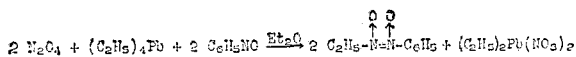

A 3-necked round bottom flask equipped with a stirrer and with one neck of the flask equipped with a capillary tube is employed. 32.3 grams of tetraethyllead, 21.4 grams of nitrosobenzene and 400 milliliters of diethyl ether are mixed together in the flask at room temperature and atmospheric pressure. 18.4 grams of dinitrogen tetroxide is bubbled into the solution in the flask through the capillary tube while stirring vigorously. During this procedure, the flask is contained in a water bath as the reaction is exothermic. After the reaction is completed, the solution is filtered and the filtrate is evaporated. Substantial yield of the ethyl-phenyl nitroso dimer is obtained.

EXAMPLE II

The procedure of Example I is followed except the solvent used is $CHCl_3$. Similar yield is obtained.

EXAMPLE III

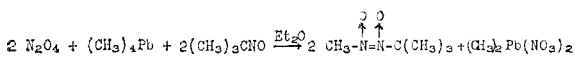

The procedure of Example I is followed except that 26.7 grams of tetramethyllead and 17.4 grams of 2-methyl, 2-nitroso propane (or nitroso t-butane) are mixed in 350 milliliters of diethyl ether. Substantial yield of the mixed nitroso dimer is obtained.

EXAMPLE IV

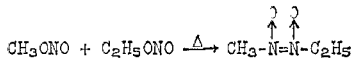

0.1 mole of methyl nitrite and 0.1 mole of ethyl nitrite are metered from separate containers into a mixing chamber or furnace. The chamber or reaction zone is heated to 380° C. and the reaction product is transferred to a Dry Ice and acetone reflux condenser or trap. Gaseous by-products are vented off. Good yield of the mixed methyl-ethyl nitroso dimer is obtained.

EXAMPLE V

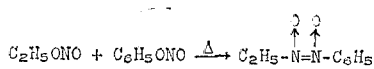

The procedure of Example IV is followed except that 0.1 mole of ethyl nitrite and 0.1 mole of phenyl nitrite are used as the reactants. Good yield of the mixed ethyl phenyl nitroso dimer is obtained.

EXAMPLE VI

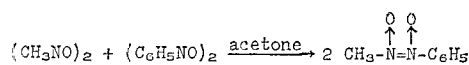

The reaction is carried out at ambient temperature and atmospheric pressure in a 1-necked round bottom flask. 9.0 grams of nitrosomethane dimer are mixed with 21.4 grams of nitrosobenzene dimer in 100 milliliters of acetone. The solution is thoroughly mixed and the solvent is removed by evaporation. Substantial yield of the mixed dimer is obtained.

The present invention has numerous advantages over prior art methods in that by varying the hydrocarbon groups in the equations, optimum performance as an antiknock agent, both for general and for specific uses can be obtained. By incorporating stable nitroso compounds in dimeric units with unstable nitroso compounds (e.g. $C_2H_5NO$), the unstable nitroso compound is in effect stabilized and permitted to function as an antiknock agent.

The present invention provides improved methods in preparing mixed nitroso dimers for use principally as antiknock agents for hydrocarbon fuels, especially gasoline, for internal combustion engines.

The description hereinabove is illustrative and explanatory of the invention and various changes may be made therein without departing from the scope of the invention.

What is claimed is:

1. A method of preparing mixed nitrosoalkanes or nitroso aromatic dimers as follows:

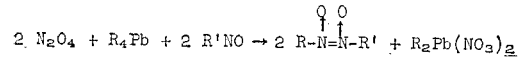

wherein R and R' are different alkyl or aryl groups.

2. The method of claim 1, wherein the reaction is carried out in the presence of a solvent.

3. The method of claim 2, wherein the solvent is selected from the group consisting of an ether, a ketone, an alkyl halide, an aliphatic hydrocarbon and an aromatic hydrocarbon.

4. The method of claim 1, wherein R is an ethyl group and R' is a phenyl group.

5. The method of claim 1, wherein R is a methyl group and R' is a tertiary butyl group.

References Cited

UNITED STATES PATENTS 3,341,511   9/1967   Tanaka et al. _____ 260—647 X

OTHER REFERENCES

Rodd's Chemistry of Carbon Compounds, S. Coffey, editor, 2nd ed., vol. I, Part B, Elsevier Pub. Co. London, 1964, p. 108.

LELAND A. SEBASTIAN, Primary Examiner

U.S. Cl. X.R.

260—437 R, 647